(12) United States Patent
Braswell et al.

(10) Patent No.: US 6,966,412 B2
(45) Date of Patent: Nov. 22, 2005

(54) POSITION-SENSITIVE SHOCK ABSORBER

(75) Inventors: Douglas K. Braswell, Red Lake Falls, MN (US); Del R. Nelson, Thief River Falls, MN (US); Brian W. Dick, Thief River Falls, MN (US)

(73) Assignee: Arctic Cat Inc., Thief River Falls, MN (US)

( * ) Notice: Subject to any disclaimer, the term of this patent is extended or adjusted under 35 U.S.C. 154(b) by 0 days.

(21) Appl. No.: 10/373,606

(22) Filed: Feb. 24, 2003

(65) Prior Publication Data

US 2004/0163905 A1    Aug. 26, 2004

(51) Int. Cl.$^7$ ................................................ F16F 9/48
(52) U.S. Cl. .................. 188/286; 188/313; 188/322.19
(58) Field of Search ........................ 267/120; 188/281, 188/282.6, 282.7, 282.8, 286, 300, 315, 322.13, 188/322.2, 313, 322.19

(56) References Cited

U.S. PATENT DOCUMENTS

| | | | |
|---|---|---|---|
| 1,526,169 A | | 2/1925 | Melchior |
| 1,548,773 A | | 8/1925 | Ziebarth |
| 1,548,774 A | * | 9/1925 | Aronson ........................ 300/6 |
| 2,323,352 A | * | 7/1943 | Pitts ....................... 74/501.5 H |
| 3,388,883 A | * | 6/1968 | Wossner et al. .......... 248/188.2 |
| 3,471,140 A | * | 10/1969 | Ballard ........................ 267/117 |
| 3,762,514 A | * | 10/1973 | Freitag ........................ 188/300 |
| 4,139,186 A | * | 2/1979 | Postema et al. ........ 188/322.19 |
| 4,500,075 A | * | 2/1985 | Tsuchiya et al. ............ 267/226 |
| 5,934,422 A | * | 8/1999 | Steed ........................... 188/318 |
| 6,112,868 A | | 9/2000 | Graham et al. |

FOREIGN PATENT DOCUMENTS

| | | |
|---|---|---|
| DE | 295 10 121 U 1 | 10/1995 |
| FR | 1504721 | 10/1966 |

* cited by examiner

*Primary Examiner*—Chris Schwartz
(74) *Attorney, Agent, or Firm*—Black Lowe & Graham; Darren J. Jones

(57) ABSTRACT

A position-sensitive shock absorbing device with a single cast body construction is provided. The device has a tubular member, a moveable piston within the tubular member, a first hydraulic fluid chamber defined by an interior volume of the tubular member, a bypass member attached to an outside area of the tubular member. The bypass member surrounds a portion of the tubular member and a second hydraulic fluid chamber is defined by a volume between the tubular member and the bypass member. A first and a second opening in a side of the tubular member are arranged such that the openings are fluidly connected with each other and with both the first and second hydraulic fluid chamber.

12 Claims, 5 Drawing Sheets

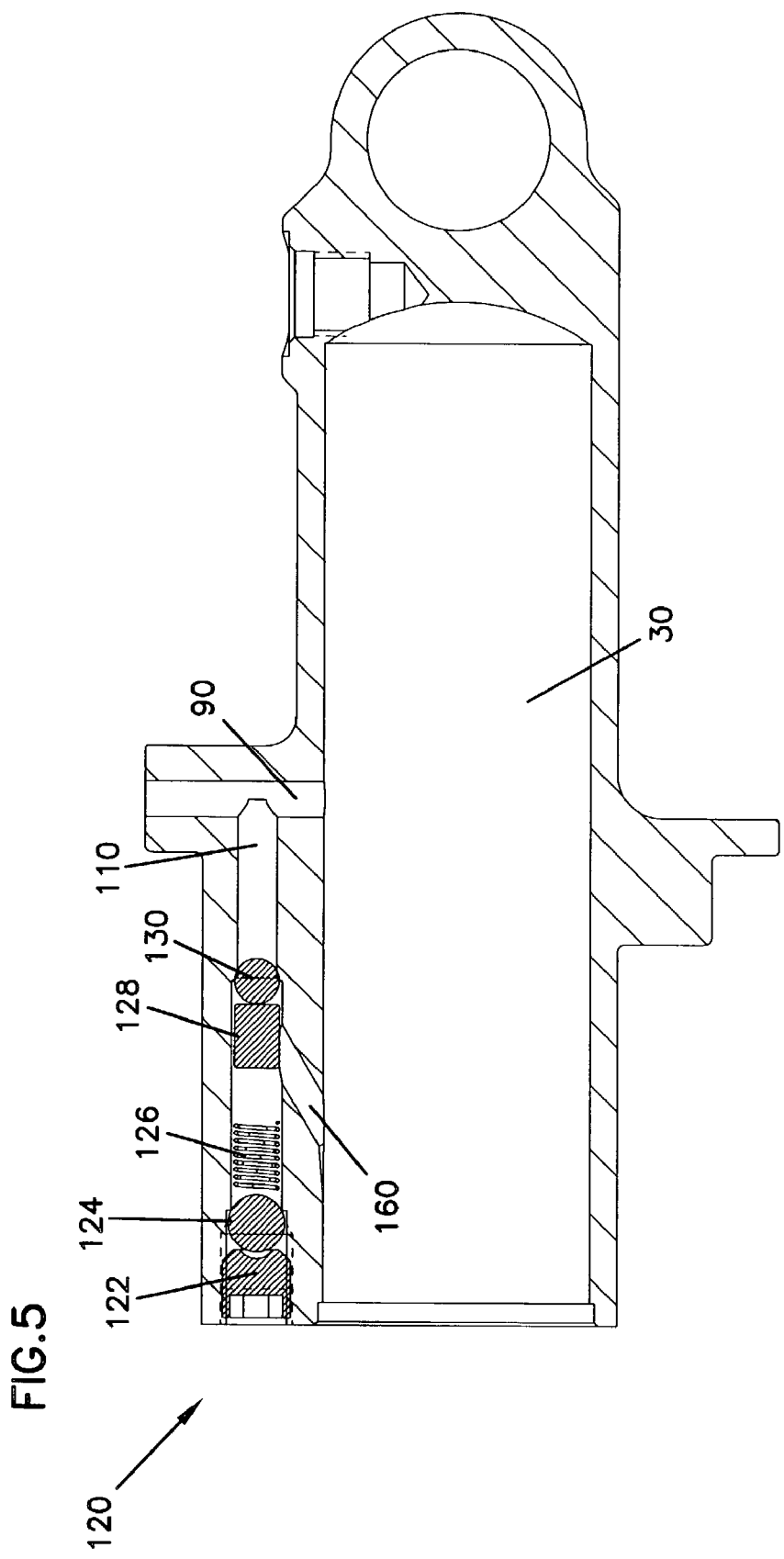

POSITION-SENSITIVE SHOCK ABSORBER

BACKGROUND OF THE INVENTION

The present invention relates to a position-sensitive shock absorber with a one-piece cast body construction.

Suspension systems are essential to provide a smooth ride over rough surfaces and therefore just about all vehicles today are equipped with some type of suspension system. A number of different types of suspension systems have been used in the past. A simple shock absorber is a cylinder, or tube, containing oil and a piston. The piston has a number of small holes in it, called valves, that allow oil to flow from one side to the other of the piston. Whether the piston is moving in the compression stroke or rebound stroke, the oil must pass through the valves in the piston. The resistance of the oil in passing through the small holes eliminates much of the energy that is directed to the suspension system from, for example, the motion of a vehicle over an uneven surface.

Another type of shock absorber is the bypass shock absorber. Bypass shock absorbers are position-sensitive shock absorbers that use external passages that allow fluid to bypass the shock piston. Conventional bypass shock absorbers use a twin tube design. That is, the shock absorber has an inner tube and an outer tube. The inner tube contains a piston and when the piston moves through the inner tube it displaces oil, or some other fluid. On the compression stroke, the piston displaces oil and the displaced oil is transferred from the inner tube to the outer tube via a transfer port. On the rebound stroke, oil is drawn back into the inner tube. U.S. Pat. No. 6,296,092, incorporated herein by reference, is one example of a twin tube shock absorber with position-sensitive damping.

The twin tube design, however, has several drawbacks. For example, the twin tube design requires the manufacture of two separate tubes. In addition, since the twin tubes are separately manufactured, the twin tubes have to be assembled into a single unit. Obviously, this increases both the time that it takes to assemble a shock absorber and increases the cost of the final product. Moreover, additional assembly steps also increase the likelihood that the shock absorber will be incorrectly or defectively assembled.

SUMMARY OF THE INVENTION

Accordingly, a need has arisen to provide a shock absorber that simplifies the design by decreasing the number of parts and simplifying the manufacturing process by which the shock absorber is produced while, at the same time, providing full rebound control.

In one aspect, the present invention provides a shock absorbing device having a tubular member, a moveable piston within the tubular member, a first hydraulic fluid chamber defined by an interior volume of the tubular member, a bypass member attached to an outside area of the tubular member, the bypass member surrounding a portion of the tubular member, a second hydraulic fluid chamber defined by a volume between the tubular member and the bypass member, and a first and a second opening in a side of the tubular member, the openings being arranged such that the openings are fluidly connected with each other and with both the first and second hydraulic fluid chamber.

In another aspect, the present invention provides a shock absorbing device further comprising a rebound control device. The rebound device is positioned between the first and second openings such that the rebound control device allows hydraulic fluid to flow from the first opening to the second opening but restricts hydraulic fluid from flowing from the second opening to the first opening.

The present shock absorber is particularly useful for recreational vehicles such as snowmobiles or all terrain vehicles (ATV's).

BRIEF DESCRIPTION OF THE DRAWINGS

FIG. 5 is a side cross-section view of the shock absorber shown in FIG. 1 to illustrate a rebound control feature of the present invention.

DETAILED DESCRIPTION OF THE PREFERRED EMBODIMENT

Figure 1:
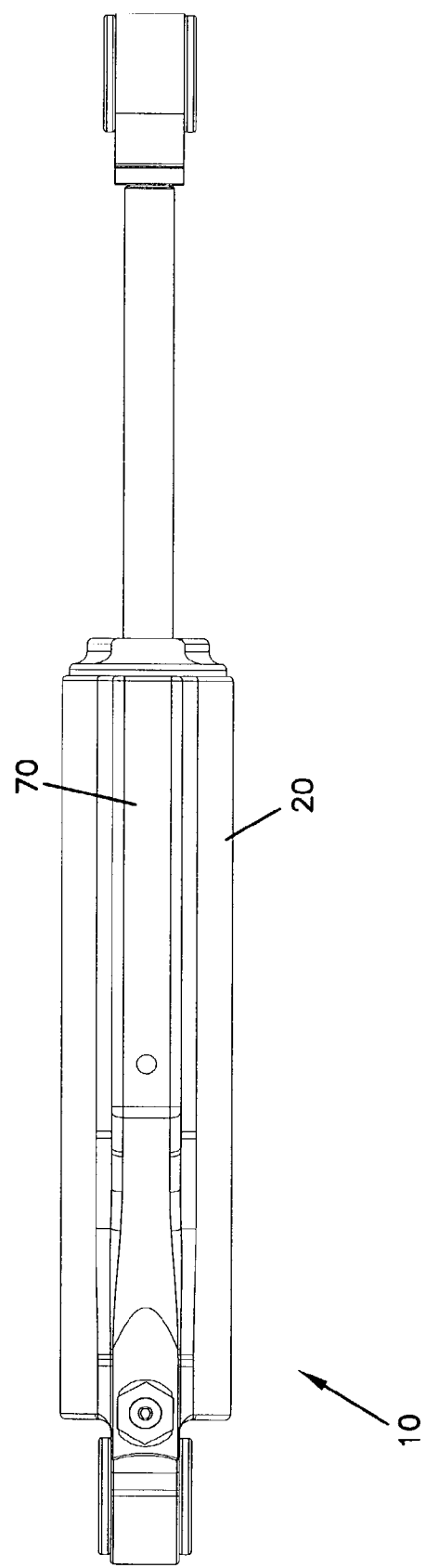
FIG. 1 is a side view of a shock absorber according to the present invention.
Figure 2:
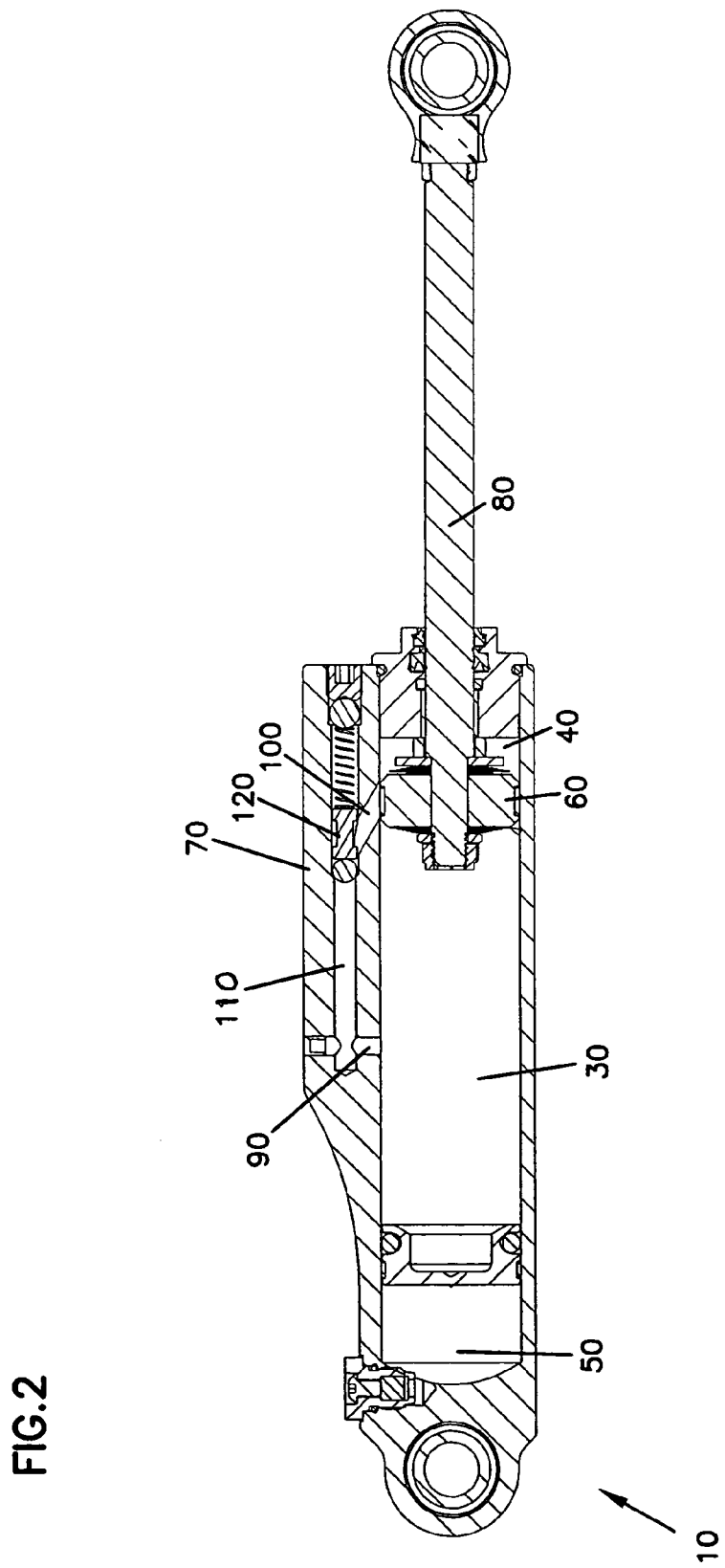
FIG. 2 is a side cross-section view of Section A—A of the shock absorber shown in FIG. 1.

FIGS. 1 and 2 illustrate one embodiment of a shock absorber 10 of the present invention. The shock absorber 10 includes a cylinder 20 with an internal volume 30. The cylinder 20 has a proximate end 40 and a distal end 50. A piston 60 is disposed within the cylinder 20 and a shock rod 80 is connected to the piston 60. The piston 60 is moveable between the proximate end 40 and the distal end 50. The piston 60 is preferably vented. A vented piston has a number of small holes in it. The holes are covered with circular flow restriction discs, called valves (not shown), that allow hydraulic fluid contained in the internal volume 30 of the cylinder 20 to flow from one side of the piston 60 to the other. Whether the piston 60 is moving in the compression stroke or rebound stroke, the hydraulic fluid must pass through the holes (valves) in the piston 60. The resistance of the hydraulic fluid in passing through the small holes absorbs energy directed to the suspension system.

A bypass path member 70 is formed at an outside area of the cylinder 20. The bypass path member 70 is preferably formed integrally with the cylinder 20 as a one-piece cast body. By forming the bypass path member 70 integrally with the cylinder 20, the shock absorber 10 can be formed in a single casting step, which can increase the structural integrity of the device as well as simplify its manufacture. However, it is possible that the bypass path member 70 could be separately produced and attached after the manufacture of the cylinder 20. In any event, the bypass path member 70 does not completely surround the cylinder 20, rather it surrounds only a portion of the cylinder 70. In addition, as can be seen clearly in FIG. 1, a part of the wall of the cylinder 20 is also the outer wall of the shock absorber.

Figure 3:
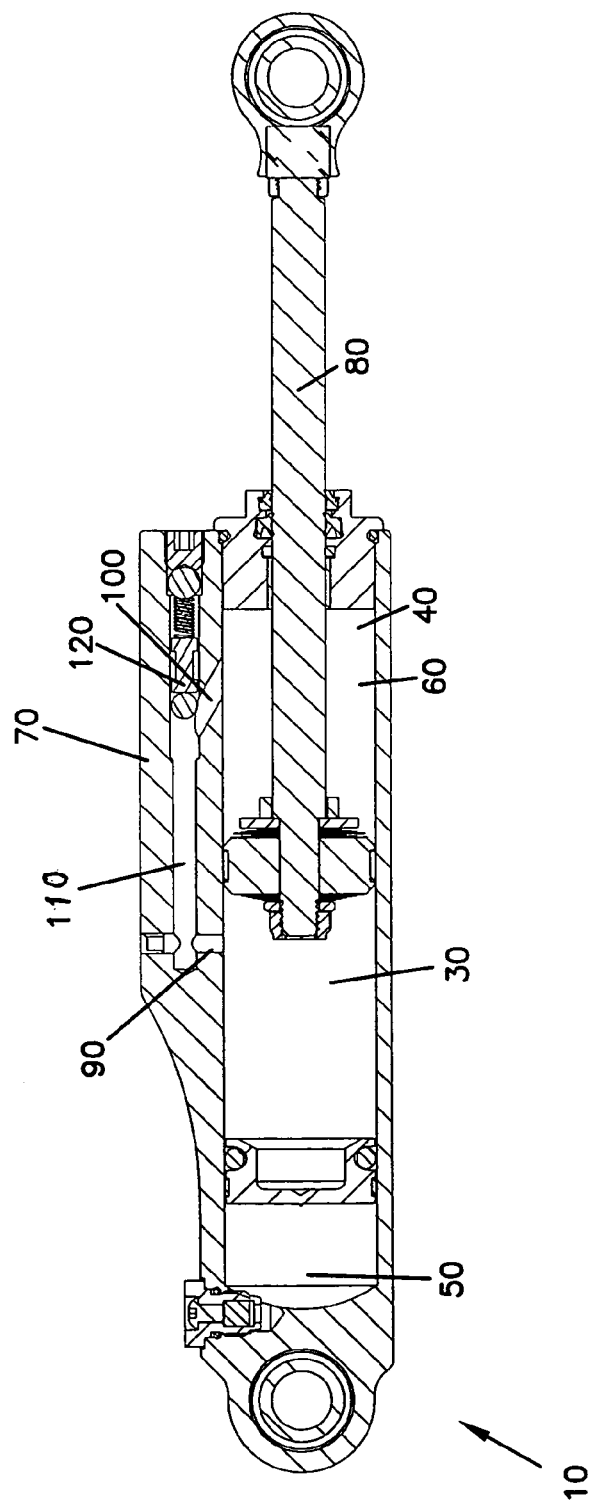
FIG. 3 is a side cross-section view of Section A—A of the shock absorber shown in FIG. 1.

A bypass channel 110 is within the bypass path member 70. A lower transfer port 90 and an upper transfer port 100 allow hydraulic fluid to bypass the piston 60 over a limited range of the piston's stroke by flowing through the bypass channel 110. As can be seen in FIG. 3, when the shock rod 80 and piston 60 travel inward, in the compression stroke, hydraulic fluid is bypassed around the piston 60 via the bypass channel 110. Since the hydraulic fluid can easily bypass the force created by the compression stroke of the shock rod 80 and piston 60, the piston 60 moves within the cylinder 20 with relatively low resistance.

Figure 4:
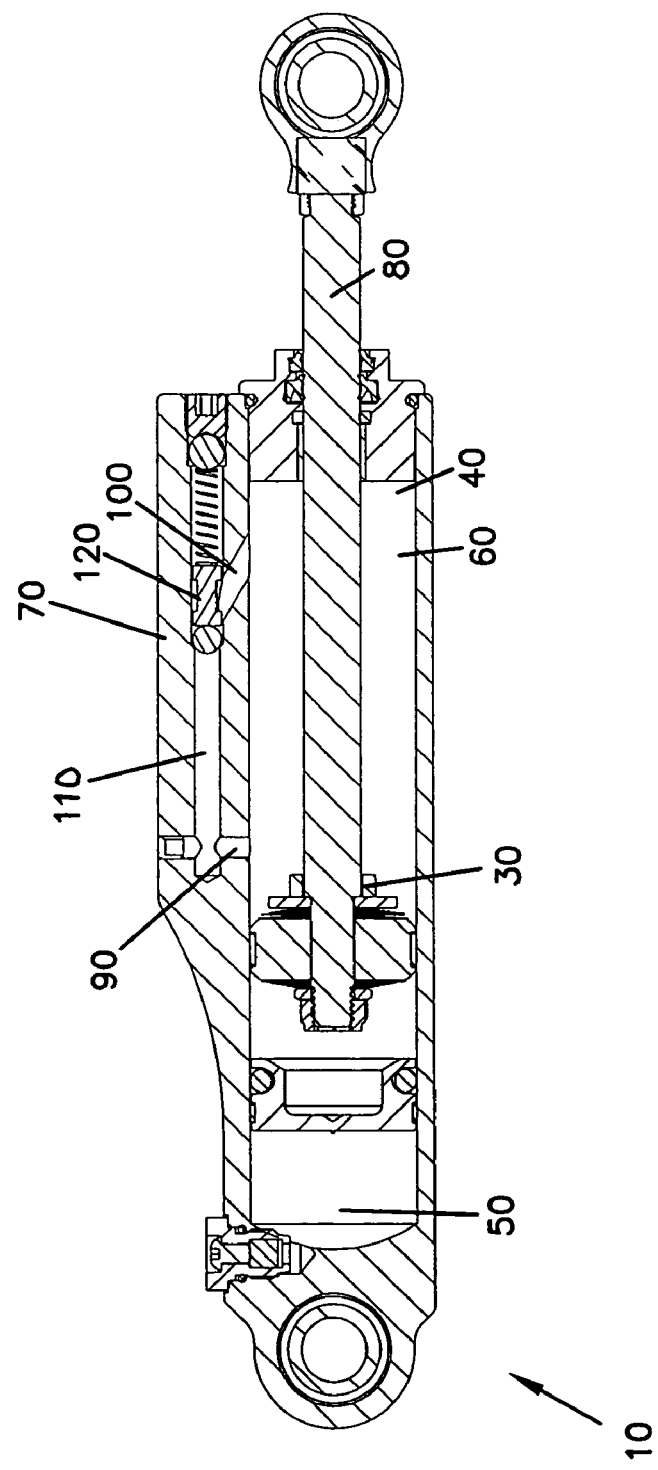
FIG. 4 is a side cross-section view of Section A—A of the shock absorber shown in FIG. 1.

However, once the piston 60 travels beyond the lower transfer port 90, as shown in FIG. 4 the piston 60 encounters the full resistance of the hydraulic fluid. Therefore, the shock absorber 10 can fully control the load in compression.

A rebound control feature is preferably contained within the bypass path member 70. As shown in FIG. 2 and, in more detail, in FIG. 5, the rebound control feature 120 functions to close flow off from the bypass channel 110 when the flow direction of the hydraulic fluid is changed at the end of the compression stroke. As the shock rod 80 and piston 60 travel outward, in the rebound stroke, the piston 60 sees full resistance of the hydraulic fluid because the bypass channel 110 is blocked by the rebound control feature 120.

The rebound control feature 120 illustrated in FIGS. 2 and 5 is an automatic check valve. As shown in FIG. 5, the rebound control feature 120 has a screw 122, a first ball 124, a spring 126, a rod 128, and a second ball 130. The rebound control feature 120 prevents hydraulic fluid from flowing from the upper transfer port 100 to the lower transfer port 90. In particular, when hydraulic fluid is forced into lower transfer port 90, the ball 130 and rod 128 are moved laterally into the spring 126, the spring 126 is compressed, and the upper transfer port 100 is opened. On the other hand when hydraulic fluid is forced against the upper transfer port 100, the rod 128 and ball 130 are restricted from moving by a narrowed area 140 of the bypass channel 110, thereby preventing the flow of hydraulic fluid into the bypass channel 110.

It will be appreciated that many different types of rebound control features can be configured within the spirit and intent of this invention. In particular, a rebound control feature that significantly restricts the flow of hydraulic fluid into the bypass channel (e.g., where an opening is substantially closed) would achieve similar positive results and would be within the ambit of the present invention. In addition, any number of transfer ports and different configurations of transfer ports can be utilized within the spirit and intent of this invention.

A number of benefits are realized by the present invention. First, no tube within a tube is needed to create a bypass path as is required in a conventional twin-tube shock absorber. Instead, the present invention describes a shock absorber that is manufactured as a one-piece cast body. Therefore, the manufacturing process can be greatly simplified, without any sacrificing of rebound control features or damping capabilities.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A shock absorbing device comprising:
   a cylindrical wall that defines a hydraulic fluid chamber;
   a moveable piston positioned within said hydraulic fluid chamber;
   a first and a second opening defined in a side of said cylindrical wall;
   a bypass channel formed on an outside area of said cylindrical wall, said bypass channel being in fluid communication with said hydraulic fluid chamber through said first and second openings, and said first and second openings being in fluid communication with each other through said bypass channel; and
   a rebound control device, said device being positioned between said first and second openings such that said rebound control device allows hydraulic fluid to flow from said first opening to said second opening but restricts hydraulic fluid from flowing from said second opening to said first opening, said rebound control device comprising:
   a ball valve positioned in said bypass channel;
   a ball valve seat positioned in said bypass channel between said first and second openings; and
   a blocking member positioned in said bypass channel, whereby hydraulic fluid displaced by said piston into said first opening can displace said ball valve and said blocking member and bypass through said second opening to said hydraulic fluid chamber, but hydraulic fluid displaced by said piston into said second opening forces said ball valve into said ball valve seat and said blocking member substantially prevents hydraulic fluid from bypassing through said first opening to said hydraulic fluid chamber.

2. A shock absorbing device according to claim 1, wherein said rebound control device is an automatic check valve.

3. A shock absorbing device according to claim 1, wherein said shock absorber is integrally formed as a single cast body.

4. A shock absorbing device according to claim 3, wherein said piston is a vented piston.

5. A shock absorbing device comprising:
   a cylindrical wall that defines a hydraulic fluid chamber having first and second ends;
   a bypass channel formed on an outside area of said cylindrical wall;
   first and second openings defined in a side of the cylindrical wall and extending between the hydraulic fluid chamber and the bypass channel to provide fluid communication there between; and
   a moveable piston positioned within the hydraulic fluid chamber and movable from a first position at the first end of the hydraulic fluid chamber, to a second position between the first and second ends of the hydraulic chamber and between the first and second openings, to a third position at the second end of the hydraulic chamber spaced axially from between the first and second openings;
   a valve member positioned within the bypass channel and movable between a first position between the first and second openings and a second position removed from between the first and second openings.

6. The shook absorbing device of claim 5, wherein the valve member permits hydraulic fluid flow from the first to the second opening and restricts hydraulic fluid flow from the second to the first opening.

7. The shock absorbing device of claim 5, wherein the bypass channel provides circulation of hydraulic fluid within the hydraulic fluid chamber between opposing sides of the piston as the piston moves within the hydraulic fluid chamber.

8. A method of absorbing shock with a shock absorbing device that includes a cylindrical wall that defines a fluid chamber of the shock absorbing device, the fluid chamber having first and second ends, first and second openings defined in the cylindrical wall, a movable piston positioned in the fluid chamber, a valve member, and a bypass channel positioned outside of the cylindrical wall and in fluid communication with the fluid chamber only through the first and second openings, the method comprising:

positioning the valve member within the bypass channel and moving the valve member in response to movement of the piston; and moving the piston axially in that portion of the fluid chamber defined between the first and second openings, wherein moving the piston in a direction from the first end towards the second end of the fluid chamber moves the valve member to a position removed from between the first and second openings to permit fluid flow through the bypass channel from the first opening to the second opening, and moving the piston in a direction from the second end towards the first end of the fluid chamber moves the valve member to a position between the first and second openings to restrict fluid flow in the bypass channel.

9. The method of claim 8, wherein the valve member includes a ball, a biasing member, and a blocking member, and moving the valve member includes moving the ball and blocking member against biasing forces of the biasing member.

10. A shock absorbing device comprising:

a cylindrical wall that defines a hydraulic fluid chamber;

a piston positioned within to hydraulic fluid chamber;

first and second openings defined in a side of the cylindrical wall;

a bypass channel formed on an outside area of the cylindrical wall, the bypass channel being in fluid communication with the hydraulic fluid chamber through the first and second openings, the bypass channel including a valve seat positioning between the first and second openings; and a rebound control device positioned in the bypass channel, the rebound control device including a valve member and a biasing member, the biasing member biasing the valve member against the valve seat to restrict hydraulic fluid flow from the second opening to the first opening when the piston is in a first position in the hydraulic fluid chamber, and when the piston moves into a second position in the hydraulic fluid chamber it moves the valve member via fluid pressure against the biasing member into a position removed from between the first and second openings.

11. The device of claim 10, wherein the first piston position is a position in the hydraulic fluid chamber removed from between the first and second openings and the second piston position is a position in the hydraulic fluid chamber between the first and second openings.

12. The device of claim 10, wherein the rebound control device further includes a blocking member positioned in the bypass channel between the valve member and the biasing member, the blocking member being movable between a position restricting hydraulic fluid flow through the second opening and another position not restricting hydraulic fluid flow through the second opening.

* * * * *

UNITED STATES PATENT AND TRADEMARK OFFICE
CERTIFICATE OF CORRECTION

PATENT NO. : 6,966,412 B2 Page 1 of 1
DATED : November 22, 2005
INVENTOR(S) : Braswell et al.

It is certified that error appears in the above-identified patent and that said Letters Patent is hereby corrected as shown below:

Column 5,
Line 25, change "to" to -- the --.

Signed and Sealed this

Ninth Day of May, 2006

JON W. DUDAS
*Director of the United States Patent and Trademark Office*